Jan. 14, 1941.   H. J. SPANNER   2,228,327
DISCHARGE DEVICE
Filed Feb. 15, 1938
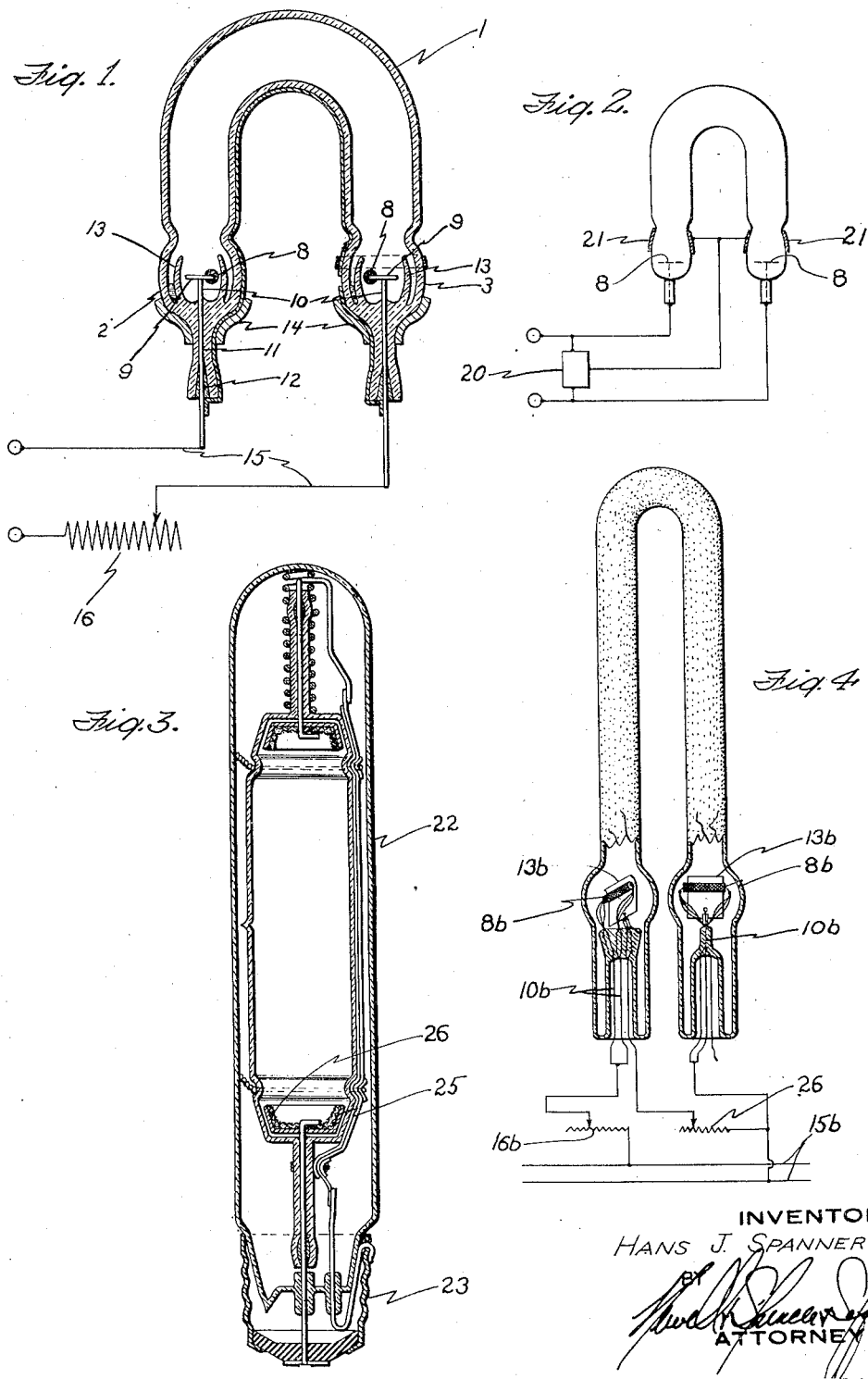
INVENTOR
HANS J. SPANNER
ATTORNEYS Patented Jan. 14, 1941

2,228,327

UNITED STATES PATENT OFFICE 2,228,327

DISCHARGE DEVICE

Hans J. Spanner, Berlin-Kladow, Germany

Application February 15, 1938, Serial No. 190,642
In Germany May 4, 1929

7 Claims. (Cl. 176—122)

This invention relates to electrical vapor discharge devices and more particularly to such devices in which a discharge is maintained between substantially non-vaporizable electrodes.

Devices of this kind have heretofore been used for radiation in various spectral ranges including both visible and ultra-violet. Most commonly such devices are provided with an atmosphere of mercury vapor or one of the rare gases neon, helium, argon, xenon, krypton. Each of these gives a discharge which is characterized by a few rather narrow spectral fields and consequently a characteristic color or ultra-violet effect.

It is an object of the present invention to extend the field of usefulness of such discharge devices by making possible the production of a more balanced or extended spectral radiation.

Another object of the invention is to improve the efficiency of electrical discharge devices, where radiation within a limited spectral range is utilized, by increasing the relative output of energy within that limited range and/or by increasing the number of lines or wave lengths at which radiation occurs within said range.

Another object of the invention is to provide a lamp suitable for the generation of any desired kind of light and especially panchromatic white light by using more than one metal vapor.

My invention contemplates the use of several constituents in the gaseous atmosphere in which the discharge occurs, these constituents being so proportioned to one another and to the loading of the discharge that one may supplement the effect which would be produced by the other or others alone and thus each takes part in the total or joint emission of the discharge atmosphere.

In the accompanying drawing and the following description I have set forth and described several embodiments of my invention and of the apparatus particularly adapted for carrying it out. It is to be understood, however, that these are in no way to be taken as exhaustive or limiting of the invention, but on the contrary are given for the purpose of instructing others in the principles of the invention and the best manner of adapting it to practical use so that others skilled in the art may be enabled to modify and adapt these embodiments so as to apply the invention according to the special requirements of any particular use.

In the accompanying drawing:

Fig. 1 is a view in longitudinal section of a lamp or ultra-violet radiator adapted for embodying my invention;

Fig. 2 is a diagrammatic view showing a discharge device similar to that of Fig. 1 with a circuit particularly adapted for bringing different constituents of the gaseous atmosphere to simultaneous or joint emission;

Fig. 3 is a view in longitudinal section of another type of lamp embodying my invention; and Fig. 4 is a view partially in elevation, partially in longitudinal section and partially diagrammatic of another type of radiation device adapted to embody the invention.

Referring first to Fig. 1, I have shown there a tube designed particularly for lighting and illumination purposes or as a source of ultra-violet rays. In this figure an elongated tube 1 is provided which may be bent in the form of a U and operated in upright position with the electrode ends 2 and 3 at the bottom. The electrodes 8 are supported through an intermediate structure 9 on the inlead wires 10 sealed through opposite ends of the tube.

In the example illustrated, the intermediate structure 9 is formed as a ring of refractory metal or a disc slotted from the side to which the electrode 8 is attached. The opposite ends of the electrode are electrically connected, e. g., by welding to the ends of the ring or disc so that, by high frequency inductance, both the ring and the electrode body proper may be heated to a temperature at which gases and impurities may be driven off from them and the preliminary activation of the electrodes effected.

The single inlead wire 10 is connected, e. g., by welding, to the intermediate structure 9.

The inlead wires 10 may be sealed to the envelope as shown, by sealing the tungsten wire directly into a tube 11 on the end of the envelope, e. g., by collapsing the tube onto the wire with vacuum applied to either end while the tube is heated to its softening temperature. The outer end, at a sufficient distance from the tube to avoid injury to the sealing material from heat developed in the tube during operation, is left with a small cup 12 into which is filled a sealing material, e. g., sealing wax, lead or a silver chloride cement, which is preferably applied while the opposite end of the tube is held under high vacuum so that in case any leak exists this sealing material will be sucked in along the wire as far as possible. This method is particularly applicable when the envelope 1 and the tube 11 are made of quartz.

In the example illustrated the electrode is surrounded by a shield 13 approximately cylindrical and restricted around the discharge path just above the electrode. These may be sealed to the wall of the envelope as shown or may be attached directly to the inlead wire 10. These shields serve to collect any materials which may be sputtered or evaporated from the electrodes and to prevent such materials from passing into the radiating part of the envelope between the electrodes. Likewise, since they are spaced from the outer envelope wall they will remain at relatively higher temperature whereby any condensation of the vaporizable materials used in the filling which may occur, whether during operation or when operation is terminated, will necessarily occur outside of these shields and there will, therefore, be substantially no danger of the condensed material such as mercury washing the sputtered or evaporated material from the walls of these shields into the other parts of the tube. If these shields are used, the ends of the tube should ordinarily be insulated, e. g., by encapsulation 14 of some heat insulating material, as asbestos, in order to prevent undesired condensation of the vaporizable material in the space between the shield and the envelope wall. To the same end, the tube may be operated in a Dewar vessel or jacket from which it may be separable; or the lighting tube itself or merely the electrode end thereof may be surrounded by one or more concentric glass or quartz tubes permeable to the desired radiation but concentrating the heat.

The lead-in wires 10 are connected to the terminals 15 of the supply line, e. g., as shown in the drawing, and if the supply line is a constant voltage circuit then a ballast device, e. g., a resistance or reactance 16 must be used in the circuit in series with the discharge.

The electrodes 8 are advantageously a porous metallic structure, e. g., twisted fine wires or fine wire mesh with a suitable activation material carried within and upon the porous structure. This type of electrode when properly activated is capable of starting at relatively low potentials and heating rapidly to an arcing temperature without substantial disintegration. This type of electrode is more fully described and claimed in my copending application, Serial No. 130,872, filed March 15, 1937. The filling or atmosphere within the envelope 1 in which the discharge occurs includes preferably an inert gas, particularly one of the rare gases such as argon, krypton, xenon, neon or helium or mixtures of them at a suitable pressure regulated for starting on the potential available and before the vaporizable material has been vaporized. Thus, with 220 volts available these gases may be used at about 2 mm. with argon, 1.5 mm. with krypton, 1 mm. with xenon, 8 mm. with neon and 12 mm. with helium. In addition to such starting gas one or more of vaporizable materials may be used and the vaporizable material may be chosen in proportion to emit jointly or simultaneously with the starting gas or several of the constituents may take over the spectral emission substantially to the exclusion of the characteristic emission of the starting gas.

As the vapor constituent of the filling in these tubes may be used mercury, cadmium, magnesium, zinc, sodium and the like separately or in combination, in amounts such that they are wholly vaporized and take over the light radiation. According to the present invention two or more of such constituents may be brought to light emission at the same time, thereby giving a combined light and if desired a panchromatic white light. Whereas mercury alone would be deficient in the red ranges of the spectrum, an addition of cadmium may supply this deficiency if the vapors of the two metals are suitably proportioned and the circuit is designed to bring them both to emission.

One way of bringing both constituents to spectral emission even when under ordinary circumstances one would so far predominate as to substantially exclude the spectrum from the other is to rapidly alternate between conditions of operation which will stimulate first one and then the other constituent to emission. The arc, spark and high frequency respectively will each produce a different spectrum. Thus, for example, a tube containing several constituents may be alternately energized by high frequency and a low voltage arc or by a low voltage arc and high voltage spark.

Even with a single constituent this method may be used for completing the spectral emission or of getting alternately different light emission from the same tube since the respective spectra obtained by operating the tube by high frequency, by high voltage kicks and by a low voltage arc may be materially different.

In Fig. 2 there is shown diagrammatically a device adapted for this purpose. In this figure the special high frequency generator 20 is operated in parallel to the tube proper and will produce a discharge through the gas inside of the tube by means of special conductive coverings 21 placed near the electrodes 8 and serving as external electrodes for the high frequency current. This arrangement also facilitates starting of the tube by establishing a high frequency ionizing discharge in the space between the main electrodes 8. Instead of the high frequency generator there may be used also an interrupter with an inductance coil to give high voltage kicks.

In Fig. 3 I have shown another embodiment of my invention similar to that of Fig. 1, but using a straight tube 1a mounted within a jacket 22 and fitted in the usual way with a standard lamp base 23. The electrodes in this case are made in cup form, e. g., with a sheet metal cup 25 having a lining of one or several layers of refractory wire mesh 26 forming the porous body of the electrodes which is filled with an activating substance such, for example, as barium oxide alone or mixed with a refractory oxide such as beryllium oxide, zirconium oxide, etc., substantially as already described in connection with the electrode of Fig. 1. The tube shown is designed particularly for use with a mixture of mercury and cadmium vapors or other difficultly vaporizable materials, and like the tube shown in Fig. 1, it is designed primarily for operation at high pressure and at high efficiency.

I have found that, when mercury at high pressure is combined in the same filling with a difficultly vaporizable material such as cadmium in which it is soluble, a reduction in efficiency as compared with the lamps operating at the same temperature with only mercury is likely to occur if any of the cadmium remains unvaporized and for this reason I have designed the lamp shown in Fig. 3 with its wall close to the discharge on all sides so that it is heated throughout to a temperature sufficiently high to avoid harboring unevaporated cadmium or other metal which would amalgamate with the mercury. These same considerations are important with other metals which form amalgam such as rubidium, zinc, etc.

In the operation of the lamp as shown in Fig. 3, I prefer to provide a filling of mercury and cadmium together sufficient to give approximately atmospheric pressure and to load the lamp sufficiently to maintain the temperature on all parts of the envelope above about 500° C. The amount of cadmium should be sufficient to produce the desired red spectral emission and on the other hand should be sufficiently small that it can be completely evaporated during operation. The exact amount which is necessary to bring the red emission into evidence depends upon the current loading of the discharge. With higher current loading a lesser proportion of cadmium may be effective whereas with lower current loading a higher proportion would be needed. The exact proportion to use, therefore, will depend upon the current loading to be given to the tube and upon the particular color which is desired.

If the color of the lamp radiation is to be accurately controlled it is, of course, necessary to control the amount of various metals which are included in the filling. The higher boiling point metals need not be so accurately controlled in amount, but may be supplied in some excess, especially when they are minor constituents of the vapor filling and are materials with a higher ionization potential than the major constituents of the filling, but it is advantageous, as already set forth, to control accurately the amounts of all constituents so that there is no objectionable excess of any during operation.

I have found that the amounts of the various vapors can be very accurately controlled by adding vapors of these materials while the lamp is operating on a metered circuit. Thus, for example, a lamp can be made to operate on 110 volts with a suitable ballast and the mercury vapor added until the voltage drop of the discharge rises to 35 volts, i. e., after the lamp is started on a filling of a fixed gas used as a starting gas, and while the lamp is externally heated to its normal operating temperature, mercury vapor is filled into the envelope until the meter shows a voltage drop of approximately 35 volts between the electrodes. Then cadmium vapor or some other vapor may be inserted until the meter shows a drop of 50 volts and thereafter a third metal, e. g., bismuth, may be inserted in vapor form until the lamp shows a drop of 80 volts. The lamp may then be sealed off; the remaining 30 volts, of course, represents the voltage consumption of the ballasting device. In the same way controlled amounts of any number of materials may be added and in this way it is possible to exercise very accurate control over the intensity of the various spectral lines and e. g., to produce lamps giving a very close approximation of perfect white light. Instead of determining the dosage by voltage measurements the control of the lesser constituents may be spectroscopic, e. g., after the mercury filling, cadmium may be added until a desired alteration in the spectrum appears and then the bismuth may be added until the desired total spectrum appears.

Another combination which gives an excellent white light is mercury with cadmium and sodium in small amounts to correct the red and orange deficiencies respectively. By suitably choosing the filling material or combining various materials in the same filling a large variety of colors may be produced and similarly a desired ultra-violet radiation, particularly in the Dorno range may be obtained.

In Fig. 4, I have shown another device adapted more particularly to low pressure operation. In this case the electrodes 8b are of the activated self-starting type described more particularly in my copending application, Serial No. 130,872, filed March 15, 1937, and these are mounted upon stem seals according to practice well known to those skilled in the art. After the tube is completed and the electrode cleaned and activated by a resistance current passed through the separate lead wires 10b these lead wires at each end of the tube are short-circuited so as to produce a substantially uni-potential electrode and these are connected through a suitable ballasting device 16b to a supply line 15b. Metallic shields 13b serve the function of protecting the main radiant part of the tube against darkening by materials given off from the electrode and advantageously may also be connected, e. g., through the resistance 26 to the opposite side of the supply line from the adjacent electrode.

This tube advantageously may be filled with an inert gas, e. g., a mixture of 80% argon and 20% helium together with a certain amount of metallic vapors such as mercury and thallium, caesium, cadmium, magnesium and tin. Other inert gas may be used in place of the particular argon-helium mixture specified.

This tube may be operated on a 220 volt circuit with a resistance of 75 ohms serving as ballast at 16b and a resistance of approximately 400 ohms in the auxiliary electrode circuit at 26. By a suitable control of the amount of the vapors added to the gas both the gas itself and the vapors may take part in the emission and give, particularly in the Dorno ray field, an exceptionally full radiation spectrum and an exceptionally high efficiency of radiation in that range.

The particular structures shown in the drawing and described above are given only as examples. These are not essential to my present invention, which may be embodied in other types of discharge tubes, and those shown and described include other inventions more particularly described and claimed in copending applications Nos. 351,368, filed March 30, 1929; 387,986, filed August 23, 1929; 500,346, filed December 5, 1930; 558,148, filed August 19, 1931; 714,949, filed March 10, 1934; 744,206, filed September 15, 1934, 51,390, filed November 25, 1935; 60,774 filed January 25, 1936; 106,958, filed October 22, 1936; 124,183, filed February 5, 1937; and 159,213, filed August 16, 1937.

What I claim is:

1. In a radiant gaseous discharge device of the type having a sealed envelope, a plurality of solid electrodes fixed at spaced positions therein, at least one of which is an activated thermionic cathode adapted to operate at incandescence, and connections for passing a limited discharge current through said electrodes, said device being designed for operation from a supply line at given potential, the combination therewith of a filling therein having a plurality of constituents each adapted to exist in the gaseous state under the conditions of normal operation and being adapted in said gaseous state to carry an electrical discharge, and said constituents being present in amounts such that when said device is connected to the given potential for which it is designed all of said constituents will be excited to emit a joint radiation having a spectrum different from that of any constituent alone, in which at least one of the jointly radiating constituents is a vaporizable material vaporized by heat generated in the device by the discharge current and is present in the envelope in amount such that condensate therefrom is deposited upon the wall without forming a pool and such condensate as remains unvaporized during operation is less than would substantially impair the efficiency of radiation from the device.

2. A high pressure vapor arc lamp having a filling comprising two vaporizable materials one of which reduces the vapor pressure of the other at temperatures below the normal operating temperature whereby to hasten the reduction of pressure in the lamp and permit restarting at higher temperature than would be possible with said other alone.

3. A radiant electrical discharge device comprising a source of current, means for limiting the current loading and a discharge tube comprising electrodes spaced apart a distance greater than the inside width of the tube, at least one of said electrodes being a solid activated cathode capable of carrying on a concentrated area thereof and without destruction the current load imposed by said source and limiting means, means permeable to radiation from the discharge adapted to confine the atmosphere of the discharge and to restrict heat loss therefrom, and a filling in said confining means comprising a material which is gaseous at ordinary temperature adapted to carry the initial discharge between the electrodes and a plurality of vaporizable materials of different boiling points adapted when vaporized to take part in the radiant discharge, at least one of said vaporizable materials being readily vaporized by the heat of the discharge in the initial gas and being present in amount sufficient to increase the voltage and thereby the energy consumption of the discharge whereby increased heat is made available for vaporization of the more difficultly vaporizable material.

4. A radiant electrical discharge device as defined in claim 3 in which the most readily vaporizable material is present in limited amount which when vaporized permits the vapor of the more difficultly vaporizable material to take part in the radiant discharge.

5. A radiant electrical discharge device as defined in claim 3 in which each of the vaporizable constituents are present in amount sufficient to permit it to take part in the radiant discharge, but the amount of each being limited to give it, when fully vaporized, a definite part in the radiant emission from the discharge, and the current source and limiting means being adapted to provide a loading sufficient to vaporize all of said filling material.

6. A radiant electrical discharge device as defined in claim 3 in which the vaporizable constituents have complementary excitation spectra and are proportioned so that when fully vaporized all take part in the radiation in proportion to the strength of their characteristic spectral lines and together give a balanced spectrum.

7. A high pressure vapor discharge lamp having a plurality of vaporizable materials therein the vapors of which are adapted jointly to carry the discharge in the lamp and one of which is more readily vaporizable than another, at least the more readily vaporizable material being present in amount adapted to be completely vaporized at the temperature of normal operation of the lamp.

HANS J. SPANNER.